United States Patent [19]

Hideyama et al.

[11] Patent Number: 4,975,322

[45] Date of Patent: Dec. 4, 1990

[54] MAGNETIC RECORDING MEDIUM

[75] Inventors: Shozo Hideyama; Hajime Takeuchi, both of Yokohama, Japan

[73] Assignee: Kabushiki Kaisha Toshiba, Kawasaki, Japan

[21] Appl. No.: 364,538

[22] Filed: Jun. 12, 1989

Related U.S. Application Data

[63] Continuation of Ser. No. 240,468, Sep. 6, 1988, abandoned, which is a continuation of Ser. No. 59,182, Jun. 12, 1987, abandoned, which is a continuation of Ser. No. 866,260, May 23, 1986, abandoned.

[30] Foreign Application Priority Data

Jun. 26, 1985 [JP] Japan ................... 60-137684

[51] Int. Cl.$^5$ ............................. G11B 23/00
[52] U.S. Cl. ..................... 428/323; 427/131; 428/336; 428/408; 428/694; 428/695; 428/900
[58] Field of Search .............. 428/323, 694, 695, 900, 428/408; 427/131

[56] References Cited

U.S. PATENT DOCUMENTS

| | | | |
|---|---|---|---|
| 4,183,976 | 1/1980 | Yamada et al. | 427/131 |
| 4,511,617 | 4/1985 | Hideyama et al. | 427/128 |
| 4,528,240 | 7/1985 | Miyoshi et al. | 428/900 |
| 4,539,257 | 9/1985 | Ryoke et al. | 427/131 |
| 4,585,697 | 4/1986 | Kato et al. | 428/900 |
| 4,596,747 | 6/1986 | Nishimatsu et al. | 427/131 |
| 4,617,226 | 10/1986 | Yamaguchi et al. | 427/131 |

*Primary Examiner*—Paul J. Thibodeau
*Attorney, Agent, or Firm*—Foley & Lardner, Schwartz, Jeffery, Schwaab, Mack, Blumenthal & Evans

[57] ABSTRACT

There is disclosed a magnetic recording medium comprising a support; a conductive layer, containing a conductive carbon, formed on either surface or both the surfaces of the support; and a magnetic layer formed on the conductive layer and containing at least a magnetic powder, a lubricant, a binder resin and 0.3 to 3 parts by weight of a conductive carbon based on 100 parts by weight of the magnetic powder.

The magnetic recording medium according to this invention can maintain magnetic properties and has the excellent durability and runnabilities. In particular, the magnetic recording media of this invention can be usefully utilized for the magnetic recording as the media for floppy disks, computer tapes, highly accurate magnetic recording tapes and for high definition VTR the like which will be used very often repeatedly and will be exposed to severe circumstances.

9 Claims, No Drawings

MAGNETIC RECORDING MEDIUM

This application is a continuation of application Ser. No. 07/240,468, filed Sep. 6, 1988 now abandoned, which is a continuation of Ser. No. 07/059,182, filed June 12, 1987, now abandoned, which is a continuation of Ser. No. 06/866,260, filed May 23, 1986, now abandoned.

BACKGROUND OF THE INVENTION

This invention relates to a magnetic recording medium, and more specifically to a magnetic recording medium and which is excellent in runnabilities and durability without deteriorating its magnetic properties, and is suitable for high-density recording.

The magnetic recording media can be employed for audio tapes, video tapes, computer tapes, floppy disks and the like, but in recent years, magnetic recording tapes for high-difinition VTR are being developed.

Of the above mentioned magnetic recording media, the computer tapes, floppy disks and such magnetic recording tapes are exposed to severer use conditions as compared with the audio tapes and the video tapes, and they are thus required to have a high reliability, i.e., excellent runnabilities and durability.

Heretofore, in order to improve the above mentioned runnabilities and durability, it has been carried out to heighten a smoothness of the surfaces of the media and to prevent them from charging by sliding friction. That is, the runnabilities and the durability have been improved by adding a great deal of a conductive carbon (for example, in an amount of 5 to 7 parts by weight based on 100 parts by weight of a magnetic powder) or lubricants to a magnetic layer of each medium.

However, the addition of much carbon or lubricant just described, in particular, the addition of much carbon, lowers its recording density. That is, in the magnetic recording media for high-density recording, a ununiformly dispersed magnetic powder in the magnetic layer is necessary, but the addition of much carbon will lead to the deterioration in this dispersion and the reagglomeration of the magnetic powder, with the result that the prepared media will be diminished in magnetic properties.

Accordingly, method of overcoming such a problem of the conventional technique have been disclosed in, for example, Japanese Provisional Patent Publication No. 114206/1975 and No. 19712/1979. They are (1) a method for subjecting a support of the magnetic recording medium to a conductive treatment with the intention of cancelling the addition of a conductive material such as carbon to the magnetic layer, and (2) a method for disposing, on a conductively treated support, a magnetic layer in which an alkyl sulfate or anhydrous calcium chloride is contained, in which case, conductivity is given to the magnetic layer by means of an ion conduction of such a compound.

In these methods, however, much attention is paid to the point of a charge prevention of the medium. Therefore, under the conditions where the charge is brought about, such methods are effective to some extent but cannot give a sufficient charge prevention effect to the media for the floppy disks, the highly accurate magnetic tapes and the like which will be employed under severe conditions and in which the great durability is thus required. The latter method (2) is larger in the charge prevention effect than the former method (1), but in the latter case (2) of adding the alkyl sulfate or the like to the magnetic layer so as to provide the magnetic layer with the conductivity by the ion conduction effect cannot be obtained under the condition of a low humidity.

Further, in the magnetic recording medium in which there is used, as the magnetic powder, a hexagonal system magnetic powder having a higher insulating properties than Co-containing $\gamma$-$Fe_2O_3$ and suitable for high-density recording, any satisfactory durability cannot be obtained only by subjecting the support to the conductive treatment, since its conductivity might be insufficient. When the support to the conductive treatment has not been done is used, a large amount of the conductive carbon must be added to the magnetic layer disadvantageously. In this case, the dispersion of the magnetic powder will deteriorate, and the magnetic properties of the medium will become poor owing to the use of much carbon. After all, it will be meaningless inconveniently to make use of the hexagonal system magnetic powder suitable for high-density recording and having the high insulation resistance.

Moreover, when a metallic powder is used as the conductive material in the conductive layer, peeling strength of the magnetic recording medium will diminish, and costs will be high disadvantageously.

SUMMARY OF THE INVENTION

An object of the present invention is to provide a magnetic recording medium by which the above mentioned problems are overcome and its magnetic properties are kept up and which is excellent in runnabilities and durability and is suitable for high-density recording.

The present inventors have researched intensively to accomplish the aforesaid object, and as a result, they have found that for the purpose of obtaining the magnetic recording medium which is excellent in runnabilities and durability without deteriorating its magnetic properties, the following three requirements are essential:

(1) A surface resistivity of a support being $10^8 \Omega$ or less.

(2) A small amount of carbon being contained in a magnetic layer.

(3) A lubricant being contained in the magnetic layer.

This invention has been completed on the basis of the above mentioned knowledge.

That is, a magnetic recording medium of this invention comprises a support, a conductive layer, containing a conductive carbon, formed on either surface or both the surfaces of the support, and a magnetic layer formed on the conductive layer and containing at least a magnetic powder, a lubricant, a binder resin and 0.3 to 3 parts by weight of a conductive carbon based on 100 parts by weight of the magnetic powder.

DESCRIPTION OF THE PREFERRED EMBODIMENTS

In this invention, examples of supports each on which a conductive layer is formed include a variety of films and disks made from polyesters, polyethylenes, terephthalates, polyimides, aromatic polyesters and the like.

The conductive layer formed on either surfaces of the support and containing a conductive carbon is the first essential requirement of this invention. That is, this conductive layer has a surface resistivity of $10^8 \Omega$ or less, preferably $10^6 \Omega$ or less.

A formation of the conductive layer can be carried out by coating the support with a coating material in which a conductive carbon is dispersed, and a manner of forming a carbon coating film on the support is simple and economical.

One component dispersed in the coating material is the conductive carbon, which may be the same as in a magnetic layer described hereinafter. In the conductive layer, a binder, a curing agent and the like are used, which may be the same as in the magnetic layer. The binder suitably is one which is cross-linkable by the curing agent, heat or light, and may be water soluble and can be used in the state of an emulsion or the like. Further, a thickness of the above mentioned deposited film, electrolessly plated film or carbon coating film is not particularly limited, in so far as it is such that the film has the aforesaid surface resistivity. For example, with regard to the carbon coating film, when its thickness is within the range of about 0.3 to about 1 $\mu$m, the proper surface resistivity will be obtained.

Next, reference will be made to the magnetic layer which is formed on the above mentioned conductive layer.

The magnetic layer used in the present invention can be formed by coating the conductive layer with a magnetic coating material composed of a magnetic powder, a binder resin, a lubricant, carbon and various additives (a curing agent, a dispersant, etc.). Afterward, ordinary orientation, drying and smoothing treatment are carried out to prepare the desired magnetic recording medium.

The second essential requirement of this invention is that 0.3 to 3 parts by weight of the conductive carbon based on 100 parts by weight of the magnetic powder are contained in the magnetic layer comprising the above mentioned components.

When the content of the conductive carbon is less than 0.3 parts by weight, an inside conductivity of the magnetic layer will not be sufficient, which fact does not permit obtaining any satisfactory charge prevention effect, with the result that enough runnabilities and durability cannot be got. When it is in excess of 3 parts by weight, a dispersion of the magnetic powder will be impaired in order to lead to the deterioration in the magnetic properties. The preferable content of the conductive carbon is within the range of 0.5 to 2.0 parts by weight based on 100 parts by weight of the magnetic powder.

The conductive carbon used in this invention preferably has an oil absorption of 100 cc per 100 g or more under the measurement by a DBP process.

Examples of such conductive carbons desirably include those obtained by the furnace process, such as Ketjen black EC (trade name, available from Lion Akzo Co., Ltd.; oil absorption: 350 cc/100 g), Conductex SC (trade name, available from Columbia Carbon Co., Ltd.; oil absorption: 115 cc/100 g), Vulcan XC (trade name, available from Cabot Co., Ltd.; oil absorption: 185 cc/100 g), Laben 3200 (trade name, available from Columbia Carbon Co., Ltd.; oil absorption: 125 cc/100 g), Royal Spectra (trade name, available from Columbia Carbon Co., Ltd.; oil absorption: 220 cc/100 g), Neo Spectra Mark I and Mark II (trade name, available from Columbia Carbon Co., Ltd.; oil absorption: 210 cc/100 g and 190 cc/100 g), Conductex 40-220 (trade name, available from Columbia Carbon Co., Ltd.; oil absorption: 228 cc/100 g) and the like.

The third essential requirement of this invention is that a lubricant is contained in the magnetic layer. In this case, the lubricant is preferably contained in an amount of 1.5 to 8.0 parts by weight based on 100 parts by weight of the magnetic powder.

When the content of the lubricant is less than 1.5 parts by weight, sufficient runnabilities cannot be obtained, and when it is more than 8.0 parts by weight, the durability at a low temperature will be poor inconveniently. More preferably, the content of the lubricant is within the range of 2.0 to 6.0 parts by weight.

Examples of the lubricants include a variety of fatty acids, fatty esters and the like, but it is preferred that the fatty acid and the fatty ester are employed together.

In this invention, saturated and unsaturated fatty acids both can be employed, and examples of the fatty esters include methyl stearate, ethyl stearate, butyl stearate, butyl myristate, butyl laurate, methyl aleate and butyl palmitate.

Examples of binder resins used in this invention include urethane resins, vinyl chloride-vinyl acetate copolymers, acrylic ester resins, polyvinyl butyral resins and polyester resins.

In this invention, a variety of magnetic powders are applicable, and their examples include a hexagonal system magnetic powder, a $CrO_2$ ferromagnetic powder and a Co-treated $\gamma$-ferrite. Among these kinds of powders, the hexagonal system magnetic powder is suitable for high-density recording. Examples of the hexagonal system magnetic powder include Co; a Co alloy containing Fe or Ni; an MnBi alloy; an MnAl alloy; $RCo_5$ and $R_2Co_{17}$ which are alloys of various rare earths (R) and Co; hexagonal system ferrites containing Ba, Sr, Pb and Ca; and substituted hexagonal system ferrites in which a part of Fe of each hexagonal system ferrite is replaced with at least one element selected from the group consisting of Co, Ti, Ni, Mn, Cu, Zn, In, Ga, Nb, Zr, V and Al. Among these kinds of magnetic powders, the substituted hexagonal system ferrites are preferable in this invention.

Examples 1 to 10

As a magnetic powder, a hexagonal system barium ferrite was used in order to prepare double sided type floppy disks which would be employed under the severest conditions and was required to have excellent durability, and their durability and runnabilities were evaluated.

In the first place, a conductive coating material with which a support would be coated was prepared in accordance with a composition shown in Table 1.

TABLE 1

| Conductive carbon | Conductex SC (trade name, produced by Columbia Carbon Co., Ltd.) | 40 parts by weight |
| Binder | Urethane resin (N-2304, trade name, produced by Nippon polyurethane Co., Ltd.) | 100 parts by weight |
| Curing agent | Polyisocyanate (Colonate C-3041, trade name, produced by Nippon polyurethane Co., Ltd.) | 20 parts by weight |
| Solvent | Cyclohexanone, Methyl ethyl ketone and Toluene (equal weight, respectively) | 1500 parts by weight |

A polyester support of 75 $\mu$m in thickness were coated on both the surfaces thereof with the conductive coating material comprising the above mentioned composition, and a curing treatment was then carried out at 40° C. for 48 hours in order to form a conductively treated layer of 0.5 $\mu$m in thickness. When measured, it was found that a surface resistivity of the support was about $4 \times 10^4 \Omega$.

Next, a magnetic coating material with which the conductive layer would be coated was prepared in accordance with a composition shown in Table 2. In this case, formulating amounts of a conductive carbon to a lubricant were altered as shown in Table 3, and in Comparative examples, magnetic coating materials were prepared in the same manner with the exception that their formulating amounts were outside of the range of this invention.

drive which was adapted so that its head might be in contact with both the surfaces of the medium, and the disk was rotated at a rotational frequency of 300 rpm. A pass number of each disk was measured at 5° C., 25° C. and 50° C. at the time of when a C/N ratio was lowered as much as 1 dB.

Further, for the evaluation of runnabilities, a friction coefficient of each disk was measured at 25° C. before a running test and after three million passes.

The results are shown in Table 3.

TABLE 3

|  | Content of conductive carbon (parts by weight) | Content of lubricant (parts by weight) | C/N ratio (dB) | Durability (pass number, $\times 10^6$) at 5° C. (20% RH) | at 25° C. (50% RH) | at 50° C. (90% RH) | Friction coefficient at 25° C. before test | after $3 \times 10^6$ passes |
| --- | --- | --- | --- | --- | --- | --- | --- | --- |
| Example 1 | 0.5 | 2.0 | 0 | 15 or more | 20 or more | 30 or more | 0.25 | 0.25 |
| Example 2 | 1.0 | 2.0 | 0 | 20 or more | 25 or more | 30 or more | 0.2 | 0.2 |
| Example 3 | 1.5 | 2.5 | 0 | 25 or more | 30 or more | 30 or more | 0.2 | 0.2 |
| Example 4 | 2.0 | 3.0 | 0 | 30 or more | 30 or more | 30 or more | 0.2 | 0.2 |
| Example 5 | 2.5 | 3.5 | −0.2 | 30 or more | 30 or more | 30 or more | 0.2 | 0.2 |
| Example 6 | 3.0 | 4.5 | −0.3 | 30 or more | 30 or more | 30 or more | 0.2 | 0.2 |
| Example 7 | 2.0 | 5.0 | 0 | 23 or more | 30 or more | 30 or more | 0.2 | 0.2 |
| Example 8 | 2.5 | 6.0 | −0.2 | 23 or more | 30 or more | 30 or more | 0.2 | 0.2 |
| Example 9 | 2.0 | 3.0 | 0 | 25 or more | 30 or more | 30 or more | 0.2 | 0.2 |
| Example 10 | 2.0 | 3.0 | 0 | 20 or more | 30 or more | 30 or more | 0.2 | 0.2 |
| Comparative example 1 | 0 | 4.5 | 0 | 5 or less | 8 or less | $1 \times 10^{-3}$ or less | 0.3 | 0.5 or more |
| Comparative example 2 | 2.0 | 1.0 | 0 | 5 or less | 10 or less | $1.5 \times 10^{-3}$ or less | 0.3 | 0.5 |
| Comparative example 3 | 2.0 | 10.0 | −0.04 | 5 or less | 10 or less | $1.5 \times 10^{-3}$ or less | 0.3 | 0.5 |

TABLE 2

| Magnetic powder (Hexagonal system ferrite average grain diameter: 0.07 μm, Hc: 800 Oe) | 100 parts by weight |
| --- | --- |
| $Cr_2O_3$ | 3.5 parts by weight |
| Urethane resin (N-2301, trade name, produced by Nippon polyurethane Co., Ltd.) | 16 parts by weight |
| Vinyl chloride - Vinyl acetate copolymer (VAGH, trade name, produced by UCC) | 4 parts by weight |
| Dispersant (Lecithin) | 1.5 parts by weight |
| Curing agent (Colonate C-3041, trade name, produced by Nippon polyurethane Co., Ltd.) | 5 parts by weight |
| Conductive carbon (Ketjen black EC, trade name, produced by Lion Akzo Co., Ltd.; oil absorption: 350 cc/100 g) | 0–3.0 parts by weight |
| Lubricant consisting of: Butyl stearate 0.7 part by weight, Stearic acid 0.2 part by weight, Palmitic acid 0.05 part by weight and Myristic acid 0.05 part by weight. | 1.0 to 10.0 parts by weight |

The conductively treated layer was coated with the magnetic coating material having the above mentioned composition, and a calendar treatment was then carried out, followed by a curing treatment at 60° C. for 48 hours in order to prepare samples for evaluation.

For the evaluation of durability, each of the thus prepared floppy disk samples was put in a floppy disk In Examples 9 and 10, the used conductive carbon (Ketjen Black EC) was replaced with Vulcan XC and Conductex SC, respectively.

As described above, the magnetic recording medium according to this invention can maintain magnetic properties and has the excellent durability and runnabilities. In particular, the magnetic recording media of this invention can be usefully utilized for the magnetic recording as the media for floppy disks, computer tapes, highly accurate magnetic recording tapes for high definition VTR and the like which will be used very often repeatedly and will be exposed to severe circumstances (atmospheric temperature of 5 to 50° C. and relative humidity of 20 to 90%).

Further, also with regard to the magnetic recording medium of the present invention in which the hexagonal system ferrite having high insulating properties and suitable for high-density recording is employed, it has the sufficient conductivity and thus possesses the excellent durability and runnabilities.

Furthermore, in the magnetic recording medium of this invention, the conductive layer contains no metal, and in consequence, peeling strength of the magnetic recording medium will not deteriorate, which fact means that the durability is excellent. The medium of this invention is also economical, since the conductive carbon which is more inexpensive than a metal is used therein.

We claim:

1. A magnetic recording medium consisting essentially of:
   a support;
   a conductive layer, containing a conductive carbon, formed on at least one surface of said support; and
   a magnetic layer formed on said conductive layer and containing at least a hexagonal system ferrite magnetic powder, from 1.5 to 8.0 parts by weight based on 100 parts by weight of magnetic powder of a lubricant, a binder resin and 0.3 to 3 parts by weight of a conductive carbon based on 100 parts by weight of said magnetic powder.

2. A magnetic recording medium according to claim 1, wherein said conductive carbon contained in said magnetic layer has an oil absorption of 100 cc per 100 g or more under the measurement by a DBP process.

3. A magnetic recording medium according to claim 1, wherein said conductive carbon contained in said conductive layer has an oil absorption of 100 cc per 100 g or more under the measurement by a DBP process.

4. A magnetic recording medium according to claim 2, wherein said conductive carbon is those prepared by the furnace process.

5. A magnetic recording medium according to claim 2, wherein a content of said lubricant is within the range of 2.0 to 6.0 parts by weight based on 100 parts by weight of said magnetic powder.

6. A magnetic recording medium according to claim 2, wherein said hexagonal system ferrite powder is a substituted hexagonal system ferrite in which a part of Fe of said hexagonal system ferrite is replaced with at least one element selected from the group consisting of Co, Ti, Ni, Mn, Cu, Zn, In, Ga, Nb, Zr, V and Al.

7. A magnetic recording medium according to claim 1, wherein the content of conductive carbon is within the range of 0.5 to 2.0 parts by weight.

8. A magnetic recording medium according to claim 1, wherein the thickness of the conductive layer is in the range of about 0.3 to $1/\mu m$.

9. A magnetic recording medium according to claim 1, wherein the conductive layer further comprises a curing agent which crosslinks the binder.

* * * * *